(12) United States Patent
Braly et al.

(10) Patent No.: US 8,504,222 B2
(45) Date of Patent: Aug. 6, 2013

(54) EMERGENCY DESCENT INTERVENTION SYSTEM

(76) Inventors: George W. Braly, Ada, OK (US); Timothy Roehl, Ada, OK (US)

(\*) Notice: Subject to any disclaimer, the term of this patent is extended or adjusted under 35 U.S.C. 154(b) by 233 days.

(21) Appl. No.: 12/880,054

(22) Filed: Sep. 10, 2010

(65) Prior Publication Data

US 2011/0224849 A1  Sep. 15, 2011

Related U.S. Application Data

(60) Provisional application No. 61/241,670, filed on Sep. 11, 2009.

(51) Int. Cl.
*G05D 1/00* (2006.01)

(52) U.S. Cl.
USPC .................... 701/4; 701/3; 701/5; 701/9

(58) Field of Classification Search
USPC .............................. 701/3, 4, 5, 9
See application file for complete search history.

(56) References Cited

U.S. PATENT DOCUMENTS

| | | | |
|---|---|---|---|
| 2,439,750 A | 4/1948 | Nisbet et al. | |
| 4,651,728 A | 3/1987 | Gupta et al. | |
| H1039 H | 4/1992 | Tripp, Jr. et al. | |
| 5,337,743 A | 8/1994 | Repperger et al. | |
| 5,386,698 A | 2/1995 | Kamel | |
| 5,629,848 A | 5/1997 | Repperger et al. | |
| 5,638,059 A | 6/1997 | Pilkington | |
| 6,225,890 B1 | 5/2001 | Murphy | |
| 6,452,510 B1 | 9/2002 | Zysko | |
| 6,675,095 B1 | 1/2004 | Bird et al. | |
| 6,778,906 B1 | 8/2004 | Hennings et al. | |
| 7,008,314 B2 | 3/2006 | Horner et al. | |
| 7,035,721 B2 | 4/2006 | Koncelik, Jr. | |
| 7,246,620 B2 | 7/2007 | Conroy, Jr. | |
| 7,483,773 B1 | 1/2009 | Tripp | |
| 7,792,615 B2 | 9/2010 | Aimar | |
| 2007/0043482 A1* | 2/2007 | Aimar | 701/4 |
| 2010/0191442 A1* | 7/2010 | Kirk | 701/105 |

\* cited by examiner

*Primary Examiner* — James Trammell
*Assistant Examiner* — Jerrah Edwards
(74) *Attorney, Agent, or Firm* — R. Reams Goodloe, Jr.

(57) ABSTRACT

An emergency descent system for turbocharged piston engine powered aircraft. The flight management system is configured to challenge the pilot after a period of inactivity. Acknowledgment from the pilot resets the timer for subsequent challenge. Lack of timely pilot response sets off an alarm sequence. Lack of response to the alarm sequence sets off emergency descent by way of control by the flight management system of rate of descent, heading, ground track, and engine power by adjustment to the wastegate to the turbocharger. The control by the flight management system may incorporate direct control of the aircraft airspeed in the descent, and that may be enhanced by engine power adjustments. Upon reaching a selected target altitude, the aircraft engine power may be restored via the adjustment of the wastegate controller. At any time, when the pilot regains useful consciousness, the entire emergency descent sequence may be interrupted and normal control restored by the pilot. Additionally, the system may be configured to reset the aircraft transponder to an alarm code, in the event that the emergency descent sequence is initiated.

27 Claims, 4 Drawing Sheets

EMERGENCY DESCENT INTERVENTION SYSTEM

RELATED PATENT APPLICATIONS

This invention claims priority from U.S. Provisional Patent Application Ser. No. 61/241,670 filed on Sep. 11, 2009, entitled EMERGENCY DESCENT INTERVENTION SYSTEM, the disclosure of which is incorporated herein in its entirety, including the specification, drawing, and claims, by this reference.

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to systems and methods for automated control of general aviation aircraft operating at high altitudes and employing piston engines, and more particularly, to emergency systems and procedures for enhancing flight safety in the event of incapacitation of the pilot(s).

BACKGROUND

Many general aviation aircraft have the capability to operate at altitudes which present issues with respect to oxygen saturation of both pilots and passengers. In the United States, the Federal Aviation Regulations require that flight crews use oxygen if operating above 12,500 feet mean sea level for more than 30 minutes and at all times if the aircraft is operating at or above 14,000 feet altitude. And, passengers must be offered oxygen in unpressurized aircraft operating above 15,000 feet altitude. As the operating altitude of an aircraft increases, the "time of useful consciousness" or "TUC"—the amount of time that a pilot is able to perform his or her flying duties properly in the absence of suitable oxygen supply—becomes increasingly shorter, and thus, is critical. For example, while the TUC may be 30 minutes or more at FL 150 (15,000 feet in altitude), when at FL 250 (25,000 feet in altitude), the TUC may be only 3 to 5 minutes, or less, especially if under stress (or, for example, if exercising). Moreover, in the case of pressurized aircraft, an incident of sudden decompression may significantly decrease the TUC.

Increasingly, high performance general aviation aircraft are available, from the factory, with turbocharged piston engines. Such aircraft are able to provide excellent performance, e.g., high speed, when operating in the low "flight levels"—from about 15,000 feet up to about 25,000 feet, or more. Since the middle of the 1960's, Cessna, Beechcraft, Piper, Mooney, and other manufacturers have produced thousands of piston engine powered aircraft equipped with turbochargers that are capable and certified for flight in the middle flight level altitude ranges (18,000 to 30,000 feet, or, by standard abbreviation, simply FL 180 to FL 300). In addition, there are multiple turbocharger systems that are approved by the FAA for retro-fit on general aviation aircraft to convert normally aspirated engines to turbocharged engines, and those aircraft have the same high altitude capability. Such conversions are commonly accomplished using a Supplemental Type Certificate (STC) issued by the FAA. As used herein, the terms "turbocharged" or "turbosupercharged" or variants thereof, includes within their scope the term "turbonormalized" as it may refer to aircraft engines whose turbochargers provide only for sufficient boost pressure to equal that provided by a normally aspirated engine operating at sea level.

In any event, operation of aircraft provided with such turbo systems puts pilots, and their passengers, at altitudes where, in those rare circumstances when a mechanical problem causes a fault or other interruption in the normal oxygen supply used by the pilot, the pilot must recognize the fault condition and then take prompt steps to either restore the oxygen supply or cause the aircraft to descend to lower altitudes, since the actual available time of useful consciousness may be quite limited.

Pilot incapacitation as a result of hypoxia, i.e. lack of adequate oxygen when operating at altitude, has been suspected as a possible cause of one or more accidents involving both jet powered and piston powered aircraft. In one case, a Lear Jet cabin pressurization system failed and resulted in a fatal accident after the aircraft flew an extended path across the United States with an unconscious crew. In another accident also involving a turbine powered aircraft, a Helios Airways Boeing 737 crashed in August 2005 into a mountainous area in Greece, after the crew evidently lost consciousness after failing to properly respond to various alarm systems. More recently, there has been an accident involving a popular general aviation turbo charged aircraft where the pilot became incapacitated and overflew the flight planned destination, while the aircraft continued on under command of a sophisticated autopilot at an altitude of 25,000 feet, until the aircraft ran out of fuel on the selected fuel tank. Such accidents, and others, point to the need for installation of aircraft flight control systems with the capability to take over, at least to some limited extent, control of an aircraft in the event the crew becomes incapacitated or otherwise unresponsive, for example, if due to reduced blood oxygen saturation. With respect to large turbine powered aircraft, the presence of auto-throttles and other automated flight control systems may provide opportunities to easily install further programming responsive to such need. For example, Airbus Industries has disclosed work on development of an "auto emergency descent" feature for integration with existing flight management systems. As reported, if flight crew members are disabled by hypoxia, the system would bring the aircraft down to 10,000 ft to help the pilots recover consciousness. Currently, the system is reportedly being developed for initial use on the Model A350XWB aircraft, where the system would initiate commands, in the absence of crew action during a warning period, to descend at a maximum operating speed to level off at 10,000 feet, or a minimum en-route altitude. On the other hand, with respect to piston engine powered general aviation aircraft, autopilots are generally provided for "two-axis" operation—that is, up/down and left/right directional control—but the engine operation is largely, if not entirely, manually controlled. In short, such aircraft are not equipped with a "fly by wire" configuration susceptible to easy automation of the level of engine power output (such as the case with respect to the above mentioned large turbine aircraft, or perhaps in the case of new military unmanned aerial vehicles). Engine performance in general aviation aircraft is set by manual adjustment of the separate throttle, mixture, and propeller controls. So, even if sophisticated flight management systems are available in such aircraft, as is the case in most newly produced aircraft, there remains a problem with respect to control of engine operation in a manner that would enable an emergency descent to be accomplished quickly and safely.

Consequently, there still remains an as yet unmet need in general aviation for an improved general aviation aircraft flight management system design, and for a method of operation of turbocharged piston engines, that would enable the flight management system to take full advantage of the existing mechanical design components with respect to engine operation, and with modest modifications, provide additional software control to enable the aircraft systems and avionics equipment to provide for timely and safe controlled descent in the case of incapacitation of the aircraft pilot(s).

Moreover, it would be advantageous to accomplish such goals while providing such improvements as upgrades to older avionics systems in existing aircraft, and as modifications to existing engines or to current production designs, in order to minimize the extent, complexity, and cost of any required recertification efforts with respect to such improved general aviation aircraft.

SUMMARY

An emergency descent system for aircraft using turbocharged piston engines is provided. When such aircraft operate at flight levels, i.e., at 18,000 feet or above (or optionally at any time if below 18,000 feet, or if between about 14,500 feet and 18,000 feet), an automated flight management system ("FMS" or "glass cockpit" avionics equipment) challenges the pilot at a selected time interval(s), on a repetitive challenge basis, with a "challenge" message, to determine whether or not the pilot is appropriately responsive. Such repetitive time interval may, in an embodiment, be shortened as altitude levels increase, or lengthened as altitude levels decrease. In an embodiment such a challenge may require, as a response, the pilot to push a button, or in an embodiment, multiple buttons in sequence, in order to establish that the pilot remains in a condition of useful consciousness. In an embodiment, such challenge may require the pilot to provide a specific audible input or response into the headset microphone. In the event the pilot or other crew member does not properly respond to the challenge by the FMS system within a preselected period of time (which period may, again, depend upon the actual flight level of operation), then the unresolved challenge escalates into an alarm sequence, preferably with either an aural or visual alarm, or both. For example, at FL 250, a first latency period between the time of a challenge to the pilot and the time of activation of a subsequent alarm (and thus which may also be called the pilot interrogation time delay period), may be defined, in an embodiment, to be between 1 and 5 minutes. In the event of lack of response from the pilot(s), in an embodiment, such alarms may be HUGE and out of proportion, visually or orally, to the more conventional alarms embedded in the FMS programming sequence.

Regardless of the nature of the alarm that is presented after the pilot or crew fails to timely and appropriately respond to a challenge (that is, fails to respond during the first latency period, namely the pilot interrogation time delay period), then within a preselected, but short second latency period of time, subsequent to initiation of the alarm sequence, in the absence of appropriate intervention by the pilot or crew, the FMS directs the emergency descent system to take action. Such action includes (a) selecting or confirming selection of an appropriate rate of descent for the aircraft, and (b) selecting or confirming selection of a target altitude. In an embodiment, the necessary calculations for the just mentioned items may be conducted after the first latency period. In an embodiment, the necessary calculations for the just mentioned items may be conducted after the second latency period, i.e, after activation of alarms. In an embodiment, portions of calculations may be conducted during either, or both, or during neither of the first or second latency periods, for example, after expiry of the second latency period. Thus, it should be understood that only an exemplary sequence has been depicted and described in detail herein, and that the precise order may be varied as suitable given the software and hardware capabilities and available database(s) in a particular situation. In any event, the rate of descent may be selected according to the aircraft operating limitations, but in an embodiment, may utilize suitable high speed descent, within appropriate aircraft airframe operating limitations, to expedite arrival at a the selected target altitude. In order to begin the descent, engine power is reduced by a preselected amount by sending a signal to an electronic wastegate controller located in the exhaust system so as to provide a means for exhaust gas to variably bypass the turbocharger, so that the amount of exhaust gases routed through the turbocharger is reduced, thereby reducing the speed of the turbocharger and the amount of compressed combustion air supplied to the engine via the turbocharger and thereby reducing the engine power output in rough proportion to the reduction in the amount of compressed combustion air supplied to the engine via the turbocharger. In an embodiment, the target altitude may be 12,500 feet, a suitable altitude for travel in a direction from 180 degrees magnetic to 359 degrees magnetic, in the US under visual flight rules. A suitable target altitude might be an "odd" thousand foot altitude plus 500 feet, in the case of travel on a magnetic course from 0 degrees to 179 degrees. In an embodiment, an adjustment might be suitable to provide that a preselected obstacle clearance also be provided for obstacles such as the highest terrain within a selected distance. For example, a target altitude might provide a minimum of 2000 feet of clearance above the highest terrain (or other known obstacles such as towers or tethered balloons) within 200 miles. In an embodiment, such altitude may be determined from available on board digital airspace maps consistent with a minimum safe operating altitude. In an embodiment, such preselected altitude may also involve a change in the aircraft flight direction to avoid high terrain, tethered balloons, or flight over congested areas or flight over open oceans or extended bodies of water. In any event, once the selected lower target altitude is reached, then the FMS system directs the electronic wastegate controller to adjust the bypass of exhaust gas, to route a sufficient amount of exhaust gas through the turbocharger in order restore compressed combustion air to the engine in amounts sufficient to restore engine power to an appropriate setting, to enable the aircraft to maintain the preselected target altitude. In an optional embodiment, as indicated in broken lines in FIG. 2A and as shown in detail in FIG. 2C, the FMS may also direct the aircraft transponder to change the "squawk code" to a suitable emergency code, such as 7700 or 7600, or such other code as might later be prescribed for a particular type of emergency condition.

In an embodiment, the emergency descent system for piston engine powered aircraft may be provided as part of the original equipment, by way of programming in a flight management system, and suitable control connections to the electronic wastegate system in the turbocharger system. In an embodiment, such wastegate controllers may be provided in pairs, as used on exhaust systems on either side of an aircraft engine. In an embodiment, the emergency descent system may be provided as an aftermarket add on to existing turbocharged piston engine aircraft, thus providing an additional margin of safety.

In an embodiment, existing wastegate controllers, which may be provided as conventional pneumatic hydro-mechanical devices, may be altered to provide a means to modulate and limit the supply of pressurized oil to the existing hydraulic wastegate actuator to provide functionality which is equivalent to that which can more easily be obtained with an electronic wastegate controller. In an embodiment, this can be accomplished by inserting a normally open solenoid actuated valve in the oil pressure line that supplies oil to the hydraulic actuator. The solenoid valve would be actuated by the FMS so as to restrict the oil supply to the actuator and thereby reposition the wastegate so as to by-pass more exhaust gas and thus reduce the combustion air supply to the engine and, correspondingly, the engine power output.

BRIEF DESCRIPTION OF THE DRAWING

The present invention will be described by way of exemplary embodiments, using for illustration the accompanying drawing in which like reference numerals denote like elements, and in which.

The foregoing figures, being merely exemplary, contain various elements that may be present or omitted from systems that may be implemented. Various "glass cockpit" designs are susceptible to modifications through software changes and minor wiring modifications to interface with unused I/O pins available on the connectors of the existing installed hardware. An attempt has been made to draw the figures in a way that illustrates at least those elements that are significant for an understanding of the system taught herein. The exact wording and graphic size, color, and location of messages generated by the software may be changed as required by desirable or regulatory human factor considerations. Thus, various other features may be provided in systems which nevertheless incorporate the features and provide the advantages of the present invention.

DETAILED DESCRIPTION

Figure 1:
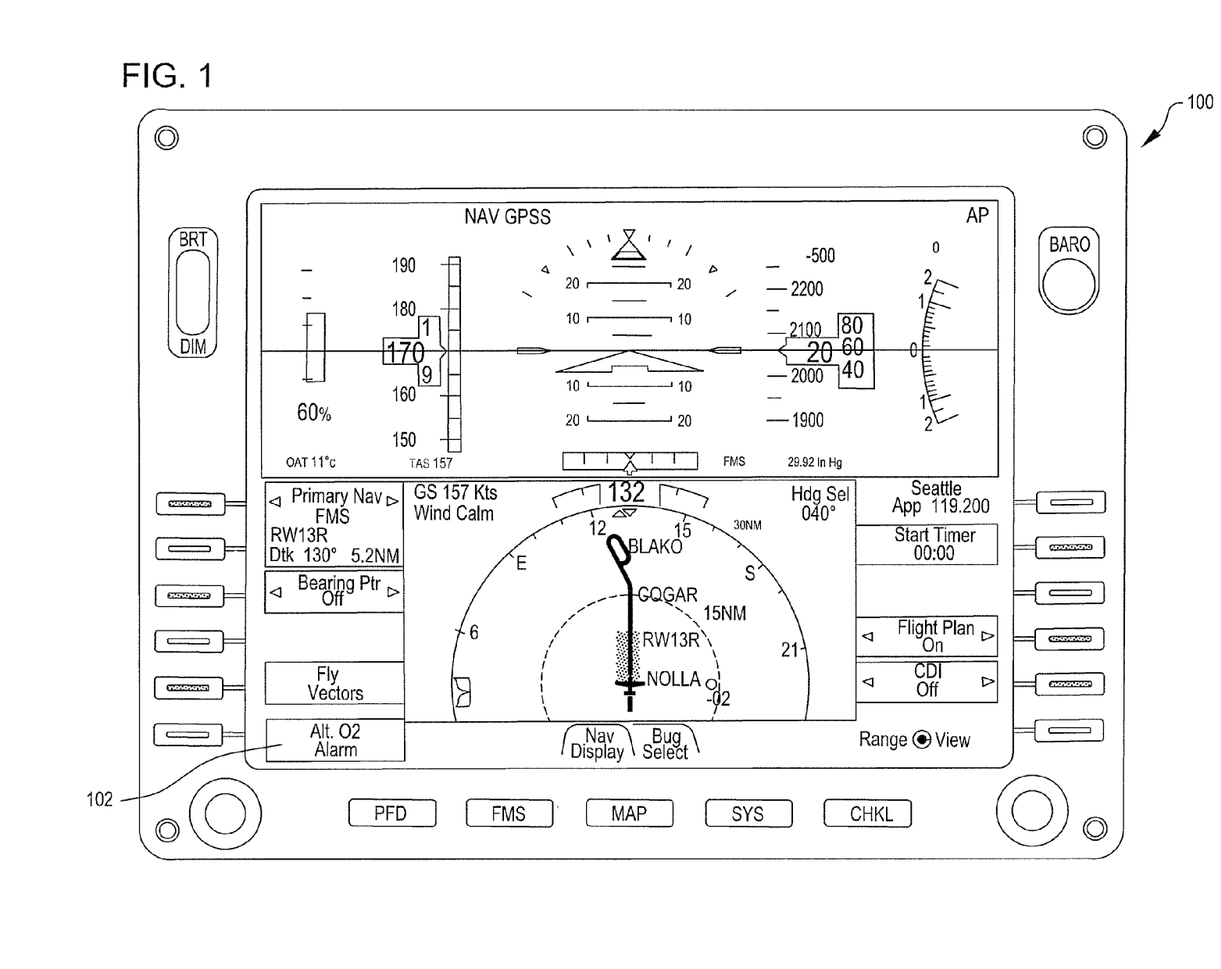
FIG. 1 is a graphical representation of an operating integrated flight display for a FMS system as used in a typical general aviation aircraft, showing an interface challenge acknowledgment and alarm that may be provided in one or more embodiments of the present invention.

An emergency descent system for aircraft using turbocharged piston engines is provided. As depicted in FIG. 1, during operation at flight levels, i.e., at 18,000 feet or above (or optionally at any time if below 18,000 feet and above about 14,500 feet), an automated flight management system ("FMS" or "glass cockpit" avionics equipment) display 100 is provided with an "alert" or "alarm" 102 which relates to the pilot physiologic status or condition that challenges the pilot at a selected time interval to respond within a selected time interval by audible or push button sequences in order to verify that the pilot is alert and responsive. In an embodiment such a challenge may require, as a response, the pilot to push the 102 screen button, once, or more, or similar or different multiple buttons (not shown) in sequence, in order to establish that the pilot remains in a condition of useful consciousness.

Figure 2A:
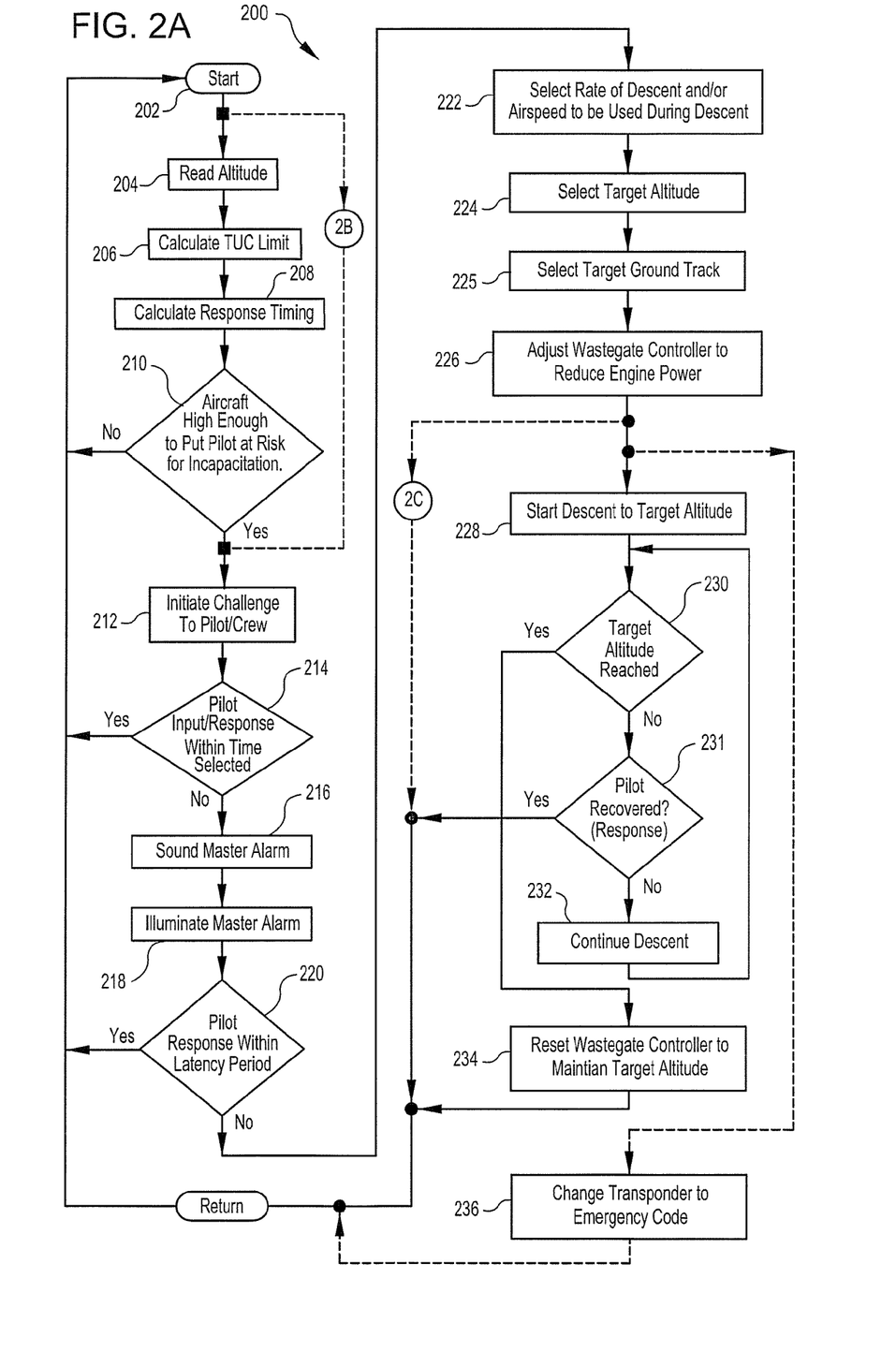
FIG. 2A is a flowchart of components for an embodiment of the emergency descent system provided by way of the present invention.
Figure 2B:
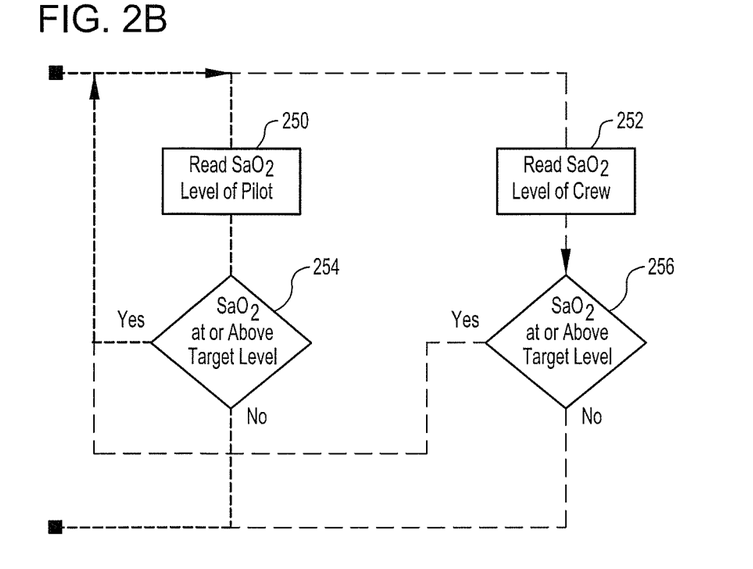
FIG. 2B is a flowchart for an embodiment of the emergency descent system provided herein, shown utilizing oxygen saturation sensors for pilot and crew as part of an emergency descent system and procedure.
Figure 2C:
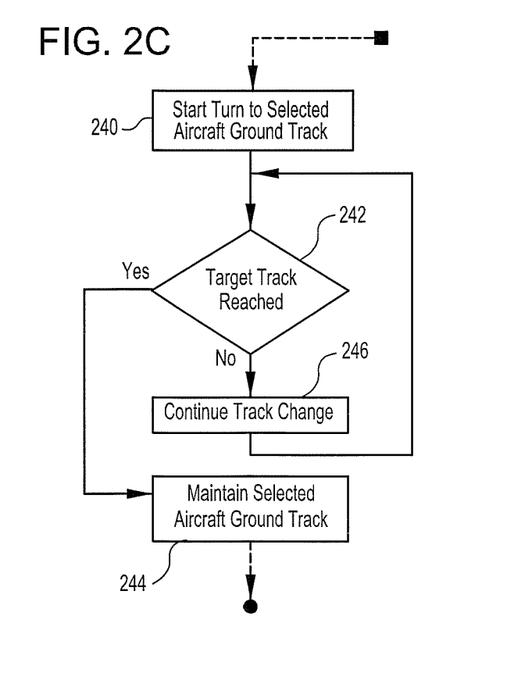
FIG. 2C is a flowchart of an embodiment of the emergency descent system provided herein, shown utilizing the function of a change in aircraft track as part of an emergency descent system and procedure.

In an embodiment, the emergency descent system as described herein may be configured as depicted in FIGS. 2A, 2B, and 2C. The system 200 starts at initial function 202 by reading the aircraft altitude, as noted in function box 204. Based on the altitude of the aircraft, the system then calculates an appropriate time interval, which may primarily be based on time of useful consciousness limit at function box 206, or may be empirically determined at some value greater than time of useful consciousness, but short enough not to permit extended flight that puts the aircraft at risk for fuel starvation or which might permanently injure the pilot or occupants. From that limit, a selected response timing is then calculated as indicated in function box 208, based on selected criteria as deemed suitable by the system designer and or applicable regulatory authorities. If the aircraft is not high enough to put the pilot at risk for incapacitation, as noted at decision box 210, then the process is aborted and loops back to the Start point at function box 202. Otherwise, a challenge is issued to the pilot as noted by function box 212. Should the pilot not properly respond to the challenge by the FMS system within a preselected period of time (a first latency period, which first latency period may depend upon the actual flight level of operation), as noted in decision box 214, then the challenge escalates into an alarm sequence at function box 216, preferably with either an aural alarm 216 or visual alarm 218 (blinking of 102, for example), or both. For example, at FL 250, the first latency period of time between time of occurrence of a challenge at function box 212 and the time of a required response at decision box 214 may be defined, in an embodiment, to be between 3 and 7 minutes, in order to assure that action be taken promptly. In the event of lack of response from the pilot(s), as at the time of expiry of the first latency period, then in an embodiment, alarms such as noted alarms 216 and 218 are activated. Such alarms may be HUGE and out of proportion, visually or orally, to more conventional alarms embedded in the FMS programming sequence.

After activation of alarms such as alarms 216 and/or alarm 218, the pilot(s) must provide a response and acknowledge the alarms within a preselected, but relatively short second latency period. Upon expiry of the second latency period, and subsequent to activation of the alarm sequence, as indicated by a "NO" at decision box 220, then the FMS directs the emergency descent system 200 to conduct the necessary activities and move to reduce engine power as appropriate. The emergency descent system 200 activities include (a) selection of an appropriate rate of descent or combination of rate of descent and aircraft indicated airspeed or Mach number, for the aircraft, as indicated at function box 222, (b) selection of a target altitude, as indicated at function box 224, and (c) either mandatory or optional selection of an aircraft ground track (depending upon the embodiment selected), as indicated at function box 225. The rate of descent may be selected according to the aircraft operating limitations, but in an embodiment, may utilize a suitable high speed or low speed descent, within desirable aircraft specific operating parameters, in order to expedite arrival at a selected target altitude. In an embodiment, for aircraft equipped with a ballistic recovery emergency parachute system, the selected descent airspeed should be slow enough so as to allow acceptable operation of the emergency parachute system in the event a pilot or occupant regains partial consciousness and then makes an inappropriate decision to initiate the use of the emergency parachute safety system. In other words, the selected descent airspeed should be at or below the maximum deployment airspeed for a selected ballistic recovery or other emergency parachute system. In order to begin the descent, engine power is reduced by a preselected amount by sending a signal to an electronic wastegate controller so as to effect an increase in exhaust gas that is by-passed around the turbocharger by the installed wastegate, so that the amount of exhaust gases routed through the turbocharger is reduced, thereby reducing the amount of compressed combustion air supplied to the engine via the turbocharger. The adjustment of the wastegate controller is indicated by function box 226. In an embodiment, the target altitude may be 12,000 feet, a suitable altitude for travel in a direction from 180 degrees magnetic to 359 degrees magnetic, in the US under instrument flight rules. A suitable target altitude might be 11,000 or 13,000 feet in the case of travel on a magnetic course from 0 degrees to 179 degrees. In an embodiment, an adjustment might be suitable to provide that a preselected obstacle clearance also be provided for obstacles such as the highest terrain within a selected distance. For example, a target altitude might provide a minimum of 2000 feet of clearance above the highest terrain (or other known obstacles such as towers or tethered balloons) within 200 miles, or for a selected clearance width along a target aircraft ground track. In an embodiment, such preselected altitude may also involve a change in the aircraft flight direction to avoid high terrain, tethered balloons, or flight over congested areas or flight over open oceans or extended bodies of water. Descent may be started, as indicated in function box 228, upon adjustment of the wastegate controller. In any event, once the selected target altitude is reached, as noted in decision box 230, then the FMS system directs the electronic wastegate controller to reduce the amount of exhaust gas, or minimize bypass of exhaust gas, in order to route a sufficient amount of exhaust gas through the turbocharger to restore compressed combustion air to the engine in amounts sufficient to restore engine power to an appropriate setting, to enable the aircraft to maintain the preselected target altitude, as noted in function box 234. At any time, if the pilot recovers and is responsive to alarms, then the emergency descent can be terminated by the pilot and/or crew, as noted in decision box 231. And, during the descent, if the target altitude is not yet reached, then the descent is continued, as noted in function box 232. In an embodiment, the emergency descent system may provide input to the FMS (for example, when engine power is reduced to start the emergency descent as noted by broken lines in FIG. 2A leading to function box 236) to direct the aircraft transponder to change the "squawk code" to a suitable emergency code, such as 7700, 7600 or some value that may later be designated for such emergencies by appropriate regulatory authorities.

Similarly, as better seen in FIG. 2C, once the selected aircraft ground track is selected, as noted at function box 225 of FIG. 2A, the flight management system can directed the aircraft to start a turn to the selected aircraft ground track, as noted in function box 240. Once the selected aircraft ground track is reached, as noted in decision box 242, then the FMS system directs aircraft flight control systems to maintain the selected aircraft ground track, as noted in function box 244. However, if the selected aircraft ground track has not been reached, as optionally noted in decision box 242, then the FMS system can continue the track change for the aircraft, as noted in function box 246. Although an embodiment has been set forth in FIGS. 2A and 2C for purposes of explanation, for purposes of the present invention, it must be appreciated that the selection of aircraft ground track, target altitude, descent rate, or descent airspeed, may be prior to, simultaneous with, or subsequent to, the separate activity of adjustment of the wastegate controller as noted in function box 226.

In an embodiment, the emergency descent system 200 for piston engine powered aircraft may be provided as part of the original equipment, by way of programming in a flight management system, and suitable control connections to the electronic waste gate system in the turbocharger system. In an embodiment, the emergency descent system may be provided as an aftermarket add on to existing turbocharged piston engine aircraft, thus providing an additional margin of safety. In an embodiment, the pneumatic hydro-mechanical controllers may be provided with additional control features, such as an electric solenoid valve, to exercise control over the turbocharger wastegate, so as to provide a means for temporarily reducing engine power upon command by the flight management system.

Figure 3:
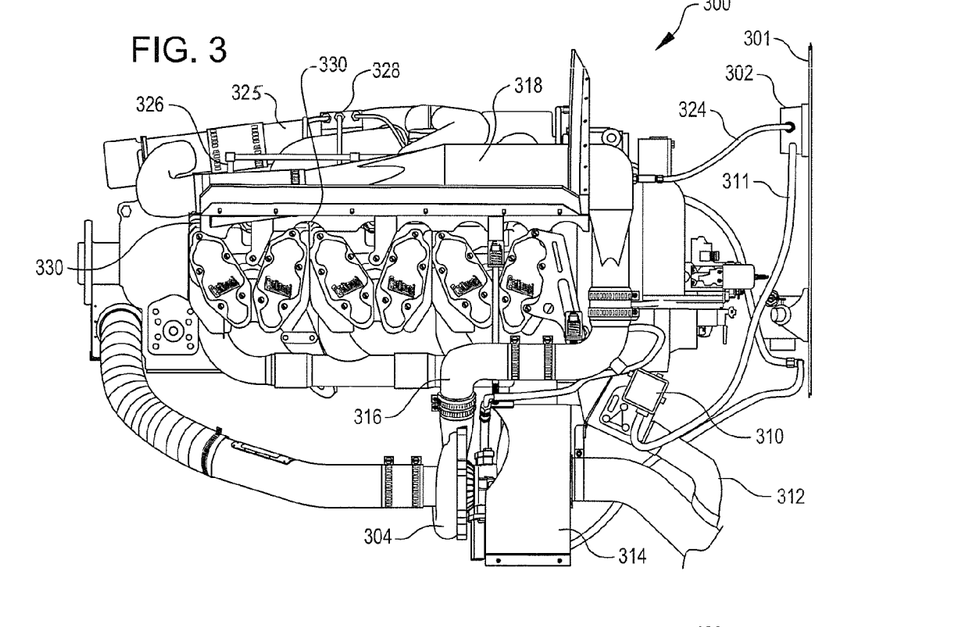
FIG. 3 is a side elevation view of a turbocharged piston engine installed in a Cirrus SR22 aircraft with an electronic wastegate controller, and utilizing the emergency descent system described herein.

As shown in FIG. 3, the Cirrus Model SR 22 aircraft is provided with an engine 300 mounted forward of firewall 301. Engine 300 is provided with a turbocharging system that employs three primary components to control the output of exhaust gas driven compressors. In an embodiment, an electronic control unit is provided as a density controller 302 for the over all system. This density controller 302 senses the output pressure and temperature from the exhaust gas driven compressor 304. The output pressure from compressor 304, commonly referred to as upper deck pressure ("UDP") is routed to the density controller 302 through a sense line 324.

The electronic control unit 302 provides signals via wiring harness 311 to operate a stepper motor actuator 310, which operates a butterfly valve (not shown) inserted into an exhaust bypass 312 which routes excess exhaust gas around the turbine section 314 of the exhaust gas driven compressor 304 so as to allow control of the speed of the compressor 304. In this manner, control is provided with respect to the mass of air flow that is discharged from the compressor 304 and into the inlet manifold 316 and through the air-to-air heat exchanger 314 and then on to the engine throttle unit 325 (details not shown). The quantity of fuel provided via fuel dividers 328 to fuel injectors 326 and then to cylinders 330 may also be controlled.

Figure 4:
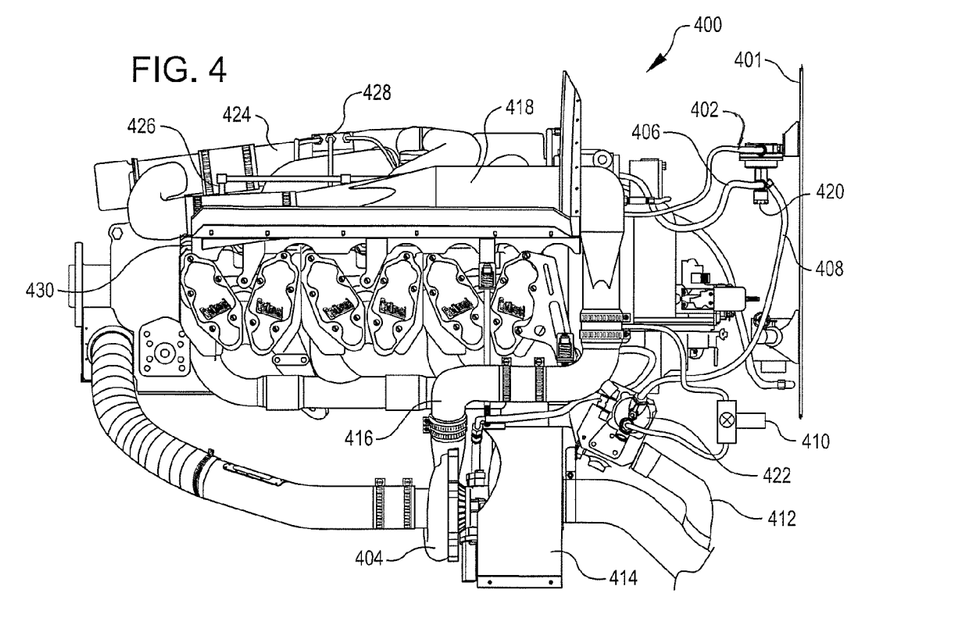
FIG. 4 is a side elevation view of a turbocharged piston engine installed in a Cirrus SR 22 aircraft with a traditional pneumatic hydro-mechanical controller, and using the emergency descent system described herein.

In another embodiment, depicted in FIG. 4, use of a pneumatic hydro-mechanical controller is shown, consisting of the basic engine 400 mounted forward of firewall 401 with related components, similar to those components first described for engine 300 in FIG. 3, but now with aneroid controller 420 which modulates oil pressure in the hydraulic actuator 422. However, in this instance solenoid valve 410 is inserted in the oil supply line to a hydraulic actuator 422. The solenoid valve 410 may be electrically actuated by the FMS to alter the function of the installed pneumatic hydro-mechanical controller 422 and to thereby re-position the wastegate to reduce the engine power to assist in controlling the speed and rate of descent. Oil outlet from the hydraulic actuator 422 is via oil line 408. The oil in line 408 passes through a metering orifice in aneroid controller 420, and then via oil return line 406 back to a sump in engine 400. Upper deck pressure reference pneumatic line 402 provides pressure indication to the aneroid controller 420. The quantity of fuel provided via fuel dividers 428 to fuel injectors 426 and then to cylinders 430 may also be controlled.

The compressed air supplied to each one of the plurality of cylinders 430 in engine 400 is normally provided at a substantially uniform mass air flow rate to each cylinder. Such conditions may be particularly significant during a portion of the normal operating mode of the engine, such as at takeoff, climb, or high power cruise conditions, but is not as critical during an emergency descent as described herein.

Engine 400 depicted in FIG. 4 is otherwise similar in installation and operation to engine 300 just described with reference to FIG. 3. The output pressure and temperature from the exhaust gas driven compressor 404 is monitored. The output pressure from compressor 404, is commonly referred to as upper deck pressure ("UDP"). Actuator 422 operates a butterfly valve (not shown) inserted into an exhaust bypass 412 which routes excess exhaust gas around the turbine section 414 of the exhaust gas driven compressor 404 so as to allow control of the speed of the compressor 404 and thus controlling the mass air flow that is discharged from the compressor 404 into the inlet manifold 416 and through the air-to-air heat exchanger 418 then on to the engine throttle unit 424 (details not shown).

In an embodiment, engine 300 or engine 400 may utilize an ignition circuit for use with a spark igniter for creating a spark for igniting fuel in the engine, wherein the ignition circuit includes one or more sensors responsive to actual operating conditions to generate an output signal, wherein the output signal provides spark timing in the engine to effect smooth combustion when the engine 300 or 400, respectively is operated.

The functionality of the emergency descent intervention system described herein may also be integrated with systems designed to directly or indirectly monitor the pilot or crew members biological condition. Such systems may include, in an embodiment, the monitoring of the oxygen saturation of the pilot ($SaO_2$) through various sensors which are commercially available; as for example noted in FIG. 2B. In such an embodiment, should the sensor 250 for a pilot or sensor 252 detect a lack of minimally acceptable $SaO_2$ for the pilot or a crew member, respectively, as noted at decision boxes 254 and 256, respectively, the system could then initiate a challenge to the pilot and/or crew, such as via use of indicator/alarm shown at function box 212, and request an appropriate response from the pilot. Failing a timely and appropriate response from the pilot or crew, a master alarm may be sounded as shown in box 216, and a master alarm may be illuminated as shown in box 218. If no response is received to such alarm during a selected time period, as noted in decision box 220, then the system 200 may initiate the emergency descent as described herein. In such a descent, by exercising direct control over the turbo charger wastegate, as in a manner such as described herein, the system will regulate engine horsepower as necessary to control descent of the aircraft.

Various related prior art software features or functionality may be implemented with respect to the aircraft avionics or flight management system, as embodied in descriptions provided elsewhere, for example, as described in other patents or patent applications, or by information in the public domain. However, the interface with FMS systems or the like, and the integration with those systems with the controller described herein to regulate the turbo charger or turbo normalizer installed on piston powered aircraft in a manner to provide control of the engine power, thus enhancing the functionality of such systems in order to provide an emergency aircraft descent system as set forth herein, is included within the disclosure of this invention, and as noted therein, is within the scope of the claims which issue thereon.

In summary, by way of providing an emergency descent system, the safety net available when operating at flight levels in general aviation aircraft can be significantly enhanced.

In the foregoing description, for purposes of explanation, numerous details have been set forth in order to provide a thorough understanding of the disclosed exemplary embodiments for the design of an emergency descent system for turbocharged piston engine aircraft. However, certain of the described details may not be required in order to provide useful embodiments, or to practice a selected embodiment, or to practice other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in a method described herein may have been described as multiple discrete activities, in turn, in a manner that is most helpful in understanding the present invention. However, the order of description should not be construed as to imply that such activities are necessarily order dependent. In particular, certain operations may not necessarily need to be performed in the order of presentation. And, in different embodiments of the invention, one or more steps of the method may be performed simultaneously, or eliminated in part or in whole while other steps or activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

Further, it should be understood by those of skill in the art and to whom this specification is directed that the term "aircraft" has been used herein consistent with US Federal Aviation Administration regulations to mean a device that is used or intended to be used for flight in the air. Under the same regulations and as used herein, the term "rotorcraft" means a heavier-than-air aircraft that depends principally for its support in flight on the lift generated by one or more rotors. Similarly, under the same regulations and as used herein, the term "helicopter" means a rotorcraft that, for its horizontal motion, depends principally on its engine-driven rotors. Finally, under the same regulations and as used herein, an "aircraft engine" means an engine that is used or is intended to be used for propelling aircraft. Appurtenances and accessories, and air compressors such as turbochargers, are normally considered by those of skill in the art, and under applicable FAA regulations, as components of the aircraft engines with respect to which they are operably connected. Thus, the application of an emergency descent system as taught herein for turbocharged aircraft engines, may include any of the above noted aircraft, and thus be within the teaching set forth herein.

Further it should be understood by those of skill in the art to whom this specification is directed aircraft piston engines normally operate over a defined range of engine crankshaft rotational speed, more commonly referred to as revolutions per minute ("RPM"). Such engines, because of certification requirements, are stated to have rated horsepower at a stated RPM. Thus, the full range of RPM conditions for engines as referred to herein should be considered to be included within the scope of claims set forth below, as applicable. Further, alterations in the stated RPM for any such engine as might be susceptible for utilization of the improvements described in this disclosure are to be treated as further variations within the teachings set forth herein.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive or limiting. As such, this disclosure is intended to cover the methods described herein and also equivalent methods. Numerous modifications and variations are possible in light of the above teachings. Therefore, the protection afforded to this invention should be limited only by the disclosure herein, the claims provided, and the legal equivalents thereof.

The invention claimed is:

1. An emergency descent intervention system, comprising:
an aircraft having a piston engine with an exhaust gas driven turbocharger having a turbocharger inlet, the piston engine having an exhaust gas manifold, and an exhaust bypass outlet, said exhaust gas manifold (a) fluidly connected to said turbocharger inlet and to said exhaust gas bypass outlet, and (b) having an exhaust gas bypass valve, said exhaust bypass valve configured to regulate the flow of exhaust gas to said exhaust gas bypass outlet and to said turbocharger inlet;
a flight management system, said flight management system having a visual display and providing aircraft directional control signals in accordance with programmed directional instructions, and aircraft altitude control signals in accordance with programmed altitude instructions;
a pilot challenge system and an alarm system, said pilot challenge system and said alarm system both integrated with said flight management system, said emergency descent intervention system configured to determine (1) a first latency period for pilot interrogation, and (2) a second latency period for alarm activation;
a reset system to reset the pilot challenge system when a response is received during the first latency period or during the second latency period;
a descent activation system that determines a target altitude and overrides said flight management system programmed altitude instructions, controls descent to said target altitude, and when said aircraft reaches said target altitude, maintains said target altitude;
an actuator for said exhaust gas bypass valve, said actuator controllable via said flight management system to regulate inlet air to, and power output from said piston engine, to enable said aircraft to descent to, and maintain, said target altitude.

2. The emergency descent intervention system as set forth in claim 1, wherein said alarm system comprises an emergency descent intervention control display in said flight management system display.

3. The emergency descent intervention system as set forth in claim 1, wherein said emergency descent intervention system comprises an emergency descent program, said emergency descent program configured to calculate a selected descent airspeed for said aircraft, said emergency descent intervention system reprogramming said flight management system to control said aircraft to said selected descent airspeed.

4. The emergency descent intervention system as set forth in claim 3, wherein said emergency descent program is configured to calculate a selected descent rate said emergency descent intervention system reprogramming said flight management system to control said aircraft to said selected descent rate.

5. The emergency descent intervention system as set forth in claim 1, wherein said emergency descent intervention system further comprises an oxygen saturation sensor and an oxygen saturation level alarm, said oxygen saturation level alarm configured to activate said pilot challenge system and reset system when oxygen saturation level of a pilot falls below a selected oxygen saturation level.

6. The emergency descent intervention system as set forth in claim 1, wherein said emergency descent intervention system further comprises an oxygen saturation sensor and an oxygen saturation level alarm, said oxygen saturation level alarm configured to activate said pilot challenge system and reset system when the oxygen saturation level of a crew member falls below a selected oxygen saturation level.

7. The emergency descent intervention system as set forth in claim 5 or in claim 6, wherein said lack of response during said second latency period activates said descent activation system.

8. The emergency descent intervention system as set forth in claim 1, wherein said emergency descent intervention system further comprises a transponder reset subroutine, said transponder reset subroutine configured to change an aircraft transponder code squawked by said aircraft upon activation of said descent activation system.

9. The emergency descent intervention system as set forth in claim 1, wherein said flight management system further comprises an acknowledgment input receiver.

10. The emergency descent intervention system as set forth in claim 9, wherein said acknowledgment input receiver comprises a touch sensitive input zone on said visual display.

11. The emergency descent intervention system as set forth in claim 1, wherein said first latency period for pilot interrogation is calculated by said flight management system based upon a then current operating flight level of said aircraft.

12. The emergency descent intervention system as set forth in claim 1, wherein said emergency descent program further comprises an aircraft emergency track subroutine, said subroutine configured to calculate a suitable aircraft ground track, to reprogram said flight management system to intercept said suitable aircraft ground track, and upon interception, maintain said suitable aircraft ground track.

13. The emergency descent management system as set forth in claim 12, wherein said emergency descent intervention system overrides said flight management system to implement intersection and tracking of said selected suitable aircraft ground track.

14. The emergency descent management system as set forth in claim 12, or in claim 13, wherein said suitable aircraft ground track comprises a holding pattern.

15. The emergency descent intervention system as set forth in claim 14, wherein said holding pattern is selected from a set of holding patterns provided by said flight management system.

16. The emergency descent intervention program as set forth in claim 1, wherein said emergency descent intervention program, after start of said emergency descent system, is manually disengageable.

17. The emergency descent intervention system as set forth in claim 1, further comprising an electronic control unit and an electric stepper motor, and wherein said exhaust bypass valve is operated by said electric stepper motor, and wherein electronic control unit is controlled by said emergency descent intervention program, thereby controlling the position of said exhaust gas bypass valve.

18. The emergency descent intervention system as set forth in claim 17, wherein said electronic control unit further comprises a density controller.

19. The emergency descent intervention system as set forth in claim 1, further comprising a pneumatic hydro-mechanical control system, and wherein said exhaust bypass valve is operated by a wastegate actuator, thereby at least partially controlling power output from said piston engine.

20. An emergency descent intervention system, comprising:
an aircraft having a piston engine with an exhaust gas driven turbocharger with a turbocharger inlet, the piston engine having an exhaust gas manifold, said exhaust gas manifold fluidly connected to said turbo charger inlet and to an exhaust gas bypass outlet, and having an exhaust gas bypass valve, the exhaust bypass valve configured to regulate the flow of exhaust gas to said exhaust gas bypass and to said turbocharger inlet,
said aircraft having flight management system, said flight management system having a visual display and providing aircraft directional control signals in accordance with programmed directional instructions, and altitude control signals in accordance with programmed altitude instructions,
said aircraft comprising an emergency parachute system, said emergency parachute system having a maximum deployment airspeed,
said emergency descent intervention system comprising:
a pilot challenge and an alarm system, said pilot challenge and said master alarm system both integrated with said flight management system, said pilot challenge system configured to determine a first latency period for pilot interrogation, and configured to determine a second latency period for pilot response to activation of said alarm system, said emergency descent intervention system configured to activate said alarm system when a response is not received by expiry of said first latency period, and configured to initiate a descent sequence when a response is not received by the expiry of said second latency period,
said emergency descent intervention system configured, upon expiry of said second latency period, to
(1) determine, or complete determination of, or accept prior calculation of a target altitude, and override the then current flight management system programmed altitude instructions,
(2) start descent of said aircraft to said target altitude, and when said target altitude is reached, maintain said target altitude;
(3) control said exhaust gas bypass valve using an actuator, said actuator controllable via said flight management system to regulate inlet air to, and power output from said piston engine, to enable said flight management system to direct the aircraft to descent to, and maintain, said target altitude;
(4) calculate a selected descent rate and selected descent airspeed for said aircraft, selected descent airspeed at or below said maximum deployment airspeed of said emergency parachute system, said emergency descent intervention system reprogramming said flight management system, and thereby controlling said aircraft with respect to said selected descent rate and said selected descent airspeed.

21. The emergency descent intervention system as set forth in claim 20, wherein said alarm system comprises an emergency descent intervention interface in said flight management system display.

22. A turbocharged piston engine aircraft, comprising:
a piston engine with an exhaust gas driven turbocharger having a turbocharger inlet, the piston engine having an exhaust gas manifold, said exhaust gas manifold (a) fluidly connected to said turbocharger inlet and to an exhaust gas bypass outlet, and (b) having an exhaust gas bypass valve, said exhaust bypass valve configured to regulate the flow of exhaust gas to said exhaust gas bypass outlet and to said turbocharger inlet,
a flight management system, said flight management system having a visual display and providing aircraft directional control signals in accordance with programmed directional instructions, and altitude control signals in accordance with programmed altitude instructions,
an emergency descent intervention system, said emergency descent intervention system comprising:
(a) a pilot challenge system and an alarm system, said pilot challenge system and said alarm system both integrated with said flight management system, said emergency descent intervention system configured to determine (1) a first latency period for pilot interrogation, and (2) a second latency period for alarm activation;
(b) a reset system to reset the pilot challenge system when a response is received during the first latency period or during the second latency period;
(c) a descent activation system that determines a target altitude and overrides said flight management system programmed altitude, controls descent to said target altitude, and when said aircraft reaches said target altitude, maintains said target altitude;
(d) an actuator for said exhaust gas bypass valve, said actuator controllable via said flight management system to regulate inlet air to, and power output from said piston engine, to enable said aircraft to descent to, and maintain, said target altitude.

23. The aircraft as set forth in claim 22, wherein said alarm system comprises an emergency descent intervention control display in said flight management system display.

24. The aircraft as set forth in claim 22, wherein said emergency descent intervention system comprises an emergency descent program, said emergency descent program configured to calculate a selected descent airspeed for said aircraft, said emergency descent intervention system reprogramming said flight management system to control said aircraft to said selected descent airspeed.

25. The aircraft as set forth in claim 24, wherein said aircraft further comprises a ballistic recovery emergency parachute system, said ballistic recovery emergency parachute system having a maximum deployment airspeed, and wherein said selected descent airspeed is at or below said maximum deployment airspeed.

26. The aircraft as set forth in claim 24, or in claim 25, wherein said emergency descent program is configured to calculate a selected descent rate said emergency descent intervention system reprogramming said flight management system to control said aircraft to said selected descent rate.

27. The aircraft as set forth in claim 22, wherein said emergency descent intervention system further comprises an oxygen saturation sensor and an oxygen saturation level alarm, said oxygen saturation level alarm configured to activate said pilot challenge system and reset system when oxygen saturation level of a pilot falls below a selected oxygen saturation level.

* * * * *

UNITED STATES PATENT AND TRADEMARK OFFICE
CERTIFICATE OF CORRECTION

| | | |
|---|---|---|
| PATENT NO. | : 8,504,222 B2 | Page 1 of 1 |
| APPLICATION NO. | : 12/880054 | |
| DATED | : August 6, 2013 | |
| INVENTOR(S) | : George W. Braly and Timothy Roehl | |

It is certified that error appears in the above-identified patent and that said Letters Patent is hereby corrected as shown below:

IN THE SPECIFICATION:

Column 4, line 14, after the words "arrival at a", delete "the".

Column 7, line 61, after the words "system can", delete "directed" and substitute therefor --direct--.

Column 8, line 14, delete "waste gate" and substitute therefor --wastegate--.

IN THE CLAIMS:

Column 11, line 67, Claim 4, after the word "rate", insert --, and--.

Column 12, line 1, Claim 4, after the words "intervention system", delete "reprogramming" and substitute therefor --reprograms--.

Column 12, line 57, Claim 16, after the words "descent intervention", delete "program" and substitute therefor --system--.

Column 12, line 59, Claim 16, after the words "after start of said", delete "emergency".

Column 12, line 59, Claim 16, after the word "descent", insert --activation--.

Signed and Sealed this
Twenty-sixth Day of November, 2013

Margaret A. Focarino
*Commissioner for Patents of the United States Patent and Trademark Office*